United States Patent
Mattina et al.

(10) Patent No.: US 7,733,898 B2
(45) Date of Patent: Jun. 8, 2010

(54) METHOD AND APPARATUS FOR PREVENTING STARVATION IN A SLOTTED-RING NETWORK

(75) Inventors: Matthew Mattina, Worcester, MA (US); George Z. Chrysos, Milford, MA (US); Yungho Choi, Seoul (KR)

(73) Assignee: Intel Corporation, Santa Clara, CA (US)

( * ) Notice: Subject to any disclaimer, the term of this patent is extended or adjusted under 35 U.S.C. 154(b) by 1150 days.

(21) Appl. No.: 10/924,819

(22) Filed: Aug. 25, 2004

(65) Prior Publication Data

US 2006/0045120 A1 Mar. 2, 2006

(51) Int. Cl.
*H04L 12/43* (2006.01)
*H04L 1/00* (2006.01)

(52) U.S. Cl. .................. 370/460; 370/239

(58) Field of Classification Search ........... 370/230, 370/230.1, 235, 369, 372, 375, 379, 412, 370/395.51, 395.7, 403–406, 414, 416, 458–460, 370/239

See application file for complete search history.

(56) References Cited

U.S. PATENT DOCUMENTS

| | | | | |
|---|---|---|---|---|
| 5,465,250 A | * | 11/1995 | Brief | 370/249 |
| 5,631,906 A | * | 5/1997 | Liu | 370/455 |
| 5,841,444 A | * | 11/1998 | Mun et al. | 345/506 |
| 5,878,265 A | * | 3/1999 | Hartmann | 712/11 |
| 6,848,009 B2 | * | 1/2005 | Pascolini | 709/250 |
| 2002/0199089 A1 | * | 12/2002 | Burns et al. | 712/228 |

OTHER PUBLICATIONS

"Foundation of Digital Logic Design," Gideon Langholz, Abraham Kandel, Joe L. Mott, Aug. 1998, p. 519, ISBN-13: 9789810231101.*
Georgiadis et al, "Throughput Properties of Fair Policies in Ring Networks", *IEEE/ACM Transactions on Networking*, pp. 718-728, vol. 1, No. 6, Dec. 1993.
Related application, U.S. Appl. No. 10/855,483, filed May 28, 2004, "Method and Apparatus for Synchronous Unbuffered Flow Control of Packets on a Ring Interconnect" and postcard receipt with Serial No.
Related application, U.S. Appl. No. 10/855,509, filed May 28, 2004, "Multiprocessor Chip Having Bidirectional Ring Treatment" and the Filing Receipt.
Related application, U.S. Appl. No. 10/855,355, filed May 28, 2004, "Flow Control Method and Apparatus for Single Packet Arrival on a Bidirectional Ring Interconnect" and the Filing Receipt.
Luiz Andre Barroso, et al., Impact of Chip-Level Integration on Performance of OLTP Workloads, Sixth International Symposium on High-Performance Computer Architecture (HPCA), Jan. 2000.

(Continued)

*Primary Examiner*—Aung S Moe
*Assistant Examiner*—Redentor M Pasia
(74) *Attorney, Agent, or Firm*—Kenyon & Kenyon LLP

(57) ABSTRACT

A method and apparatus for preventing starvation in a slotted-ring network. Embodiments may include a ring interconnect to transmit bits, with one of the bits being a slot reservation bit, and nodes coupled to the ring interconnect, with each node comprising a starvation detection element and a slot reservation element to reserve a slot for future use. In further embodiments, each node may also comprise a slot tracking element to track the location of the slot reserved by that node.

17 Claims, 6 Drawing Sheets

OTHER PUBLICATIONS

Luiz Andre Barroso, et al., Piranha: A Scalable Architecture Based on Single-Chip Multiprocessing, In Proceedings of the 27th Annual International Symposium on Computer Architecture, Jun. 2000.

Motorola Architecture Guide C-5e/C-3e Network Processor Silicon Revision B0, Chapter 8: Internal Buses, Copyright 2003 Motorola, Inc.

* cited by examiner

METHOD AND APPARATUS FOR PREVENTING STARVATION IN A SLOTTED-RING NETWORK

FIELD OF THE INVENTION

Embodiments of the present invention relate in general to data flow control in a network and in particular to preventing starvation in a slotted-ring network.

BACKGROUND

A network is a group of two or more nodes that are linked together. Flow control mechanisms in networks govern the transfer of data packets from a source node to a destination node. One type of network is a slotted-ring network, in which there are a fixed number of time slots ("slots") rotating around a transmission medium in a circular (or ring) topology. The transmission medium carries packets within these slots from source nodes to destination nodes. A slot may be referred to as "available" if it is not carrying a valid packet, and may be referred to as "busy" if it is carrying a valid packet. A slotted-ring network is said to exhibit the characteristic of "spatial reuse" if after a destination node sinks a packet from a slot, that slot become available so that another node on the ring can inject a packet into that slot.

In a slotted-ring network, traffic already on the ring has priority over traffic entering the ring. A slotted-ring network may be referred to as in a "starvation" situation if one of the nodes n on the network repeatedly fails to inject a packet onto the ring because the ring is continually busy carrying packets past that node n. This situation could persist indefinitely and may prevent the node that is suffering from starvation from ever making forward progress.

Slotted-ring networks having spatial reuse that have been employed in local area networks ("LANs") have implemented starvation management techniques that focus on maintaining fairness. Such fairness schemes ensure that the nodes on the ring network are allocated an equal amount of ring bandwidth.

DETAILED DESCRIPTION

Embodiments of the present invention provide a method and apparatus for preventing starvation in a slotted-ring network. In some embodiments, the network guarantees that a node cannot be prevented from injecting a packet on the ring for more than T cycles, where T is a parameter of the design. In some embodiments, if a node determines that it is in a starvation condition due to failure to inject a packet on the network, the node may reserve a slot on the network for its future use.

Figure 1:
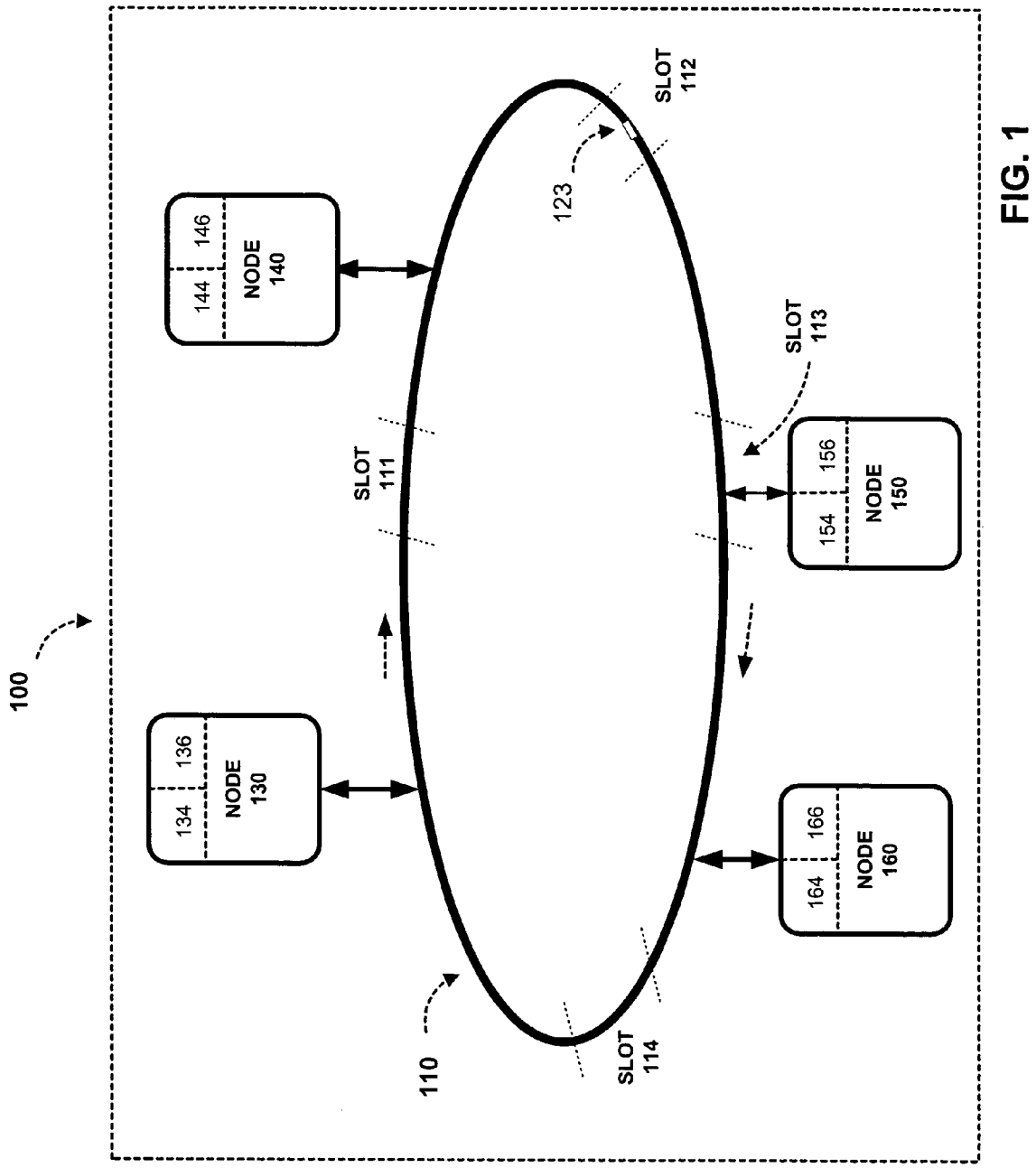
FIG. 1 is a block diagram of a slotted-ring network in accordance with an embodiment of the present invention.

FIG. 1 is a block diagram of a slotted-ring network 100 in accordance with an embodiment of the present invention. FIG. 1 shows multiple nodes 130-160 coupled to a ring interconnect 110 at various access points or stops. The term "coupled" may include items that are directly connected and/or indirectly connected. In other embodiments, the slotted-ring network may have more or less nodes, the number of nodes being a function the design implementation. In an embodiment, packets of information (e.g., data) may travel between nodes 130-160 on ring interconnect 110 in either a clockwise or counterclockwise direction. Although shown as an oval in FIG. 1, ring interconnect is typically irregularly shaped.

In FIG. 1, packets travel over ring interconnect 110 within a group of time slots ("slots") 111-114. In other embodiments, the slotted-ring network may have more or less slots, the number of slots being a function the design implementation. The number of slots may or may not be equal to the number of nodes in the network. Each slot may circle around the ring interconnect, for example under the control of a system clock. For example, slot 113 may travel past node 150, then past node 160, then past node 130, then past node 140, then past node 150 again, then past node 160 again, then past node 130 again, etc. In the embodiment shown in FIG. 1, each slot travels in a clockwise direction, but in other embodiments the slots may also travel in a counter clockwise direction. As shown in FIG. 1, slot 113 is currently at the position of node 150.

Each of the nodes 130-160 on the slotted-ring network may typically be both source nodes and destination nodes. In operation, a source node (such as node 150) may inject (i.e., "dispatch") a packet onto the network within a particular slot (such as slot 113) when it passes by that node. That packet may then travel around the ring interconnect 110 within that slot to the destination node (such as node 160), which may then sink the packet from the ring interconnect.

Each of nodes 130-160 may be, for example, a cache bank, a memory interface, a global coherence engine interface, an input/output interface, processor core, graphics co-processor or any other logic block, core, co-processor, functional unit, or the like that is designed to include an interface to communicate on the slotted ring network (e.g., in some embodiments, any packet-handling device). In an embodiment, slotted-ring network 100 may be implemented on a single semiconductor chip, such as a processor chip, and the nodes 130-160 may be components found on that single chip. In an embodiment, nodes 130-160 may be implemented as cache bank nodes by logically dividing a single large shared cache into subsets. In this embodiment, each cache bank node may include a portion of the address space in the single cache, and may independently service block requests (read, write, invalidate, etc.) for the portion of the address space in the single cache, with each cache bank node having its own access point or stop on interconnect 110. In other embodiments, slotted-ring network 100 may also be another configuration, for example a network of computers such as a Local Area Network (LAN) or Wide Area Network (WAN).

Figure 2:
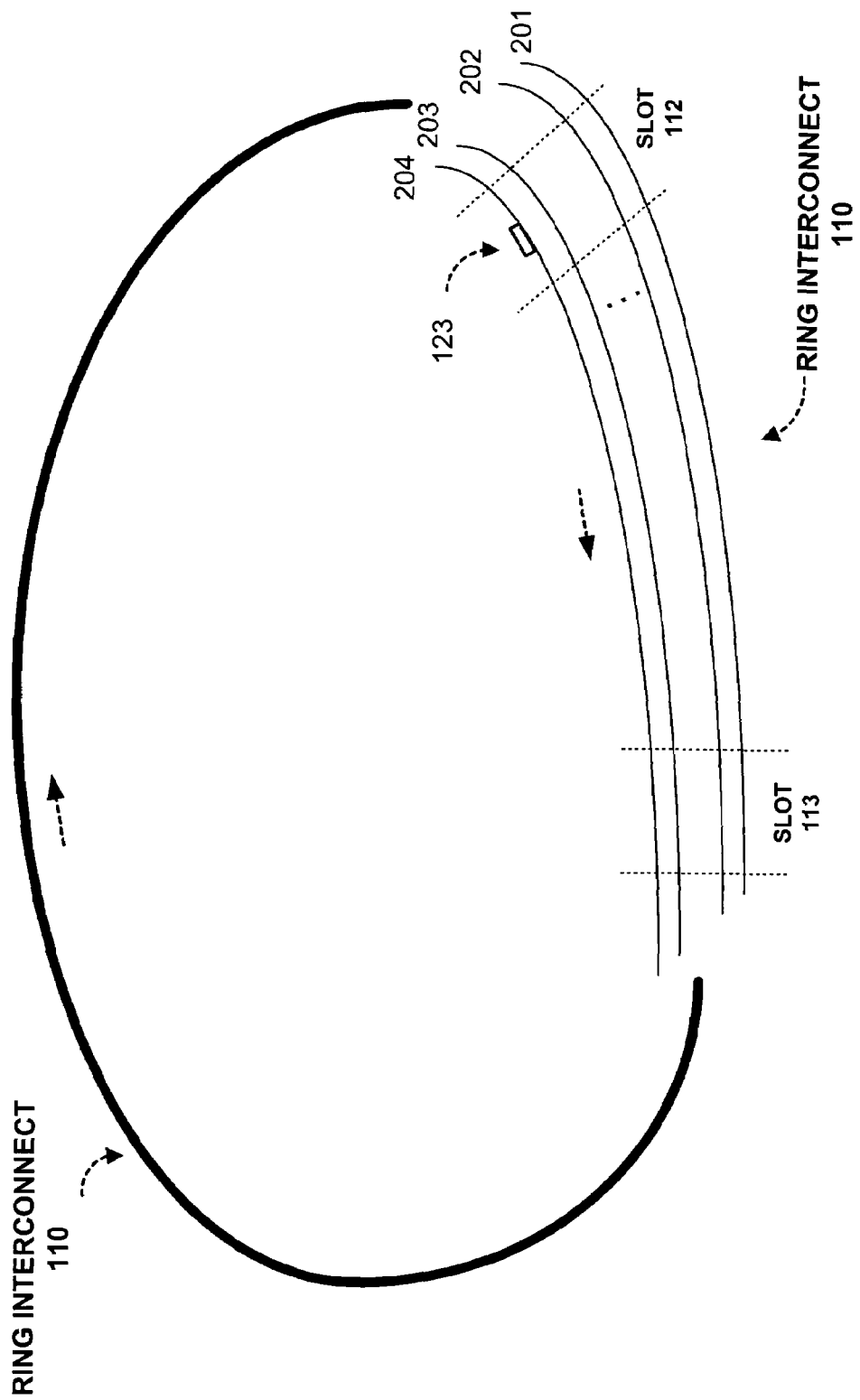
FIG. 2 is a block diagram showing a more detailed view of a ring interconnect in accordance with an embodiment of the present invention.

In FIG. 1, ring interconnect 110 may include multiple unidirectional wires (shown in FIG. 2). In an embodiment, a first set of the unidirectional wires may transport packets in a clockwise direction and a second set may transport packets in a counterclockwise direction. Each set of unidirectional wires may have either a specific purpose (e.g., sending address commands) or a general purpose (e.g., supporting multiple packet types, such as an address request, data, cache coherence protocol message, etc.). Alternatively, each set of unidirectional wires may be designated to transport a single packet type. Alternatively, ring interconnect 110 may include multiple bidirectional wires capable of transporting packets in both directions. In this embodiment, the network may include switching logic to switch each wire to a desired direction to transport packets during a particular transaction.

Ring interconnect 110 may transport packets at various rates. For example, ring interconnect 110 may transport packets at a rate of one or more nodes per clock cycle or one node every two or more clock cycles. Many factors may determine the transport rate including the amount of traffic, the clock rate, the distance between nodes, etc. Generally, a node waits to dispatch a packet onto ring interconnect 110 until any packet already at the node's position on ring interconnect 110 passes the node.

In an embodiment, the ring interconnect transmits a plurality of bits in each slot, and one of the bits in each slot is a slot reservation bit, which is shown in slot 112 as slot reservation bit 123. In an embodiment, each of the nodes 130-160 may contain a starvation detection element (134, 144, 154, and 164) and a may contain a slot reservation element (136, 146, 156 and 166), which will be described in more detail below. In other embodiments, only one or a subset of the slots may have a slot reservation bit.

FIG. 2 is a block diagram showing a more detailed view of a ring interconnect in accordance with an embodiment of the present invention. FIG. 2 shows ring interconnect 110, slot 112 and slot 113 of FIG. 1. FIG. 2 shows ring interconnect 110 as comprising a plurality of lines, of which lines 201-204 are shown in FIG. 2. Ring interconnect may transmit a plurality of bits, which may be transmitted within slots. Although only four lines are shown in FIG. 2, ring interconnect 110 may have more or less lines, and for example may have 512 lines. In the embodiment shown in FIG. 2, line 204 is dedicated to transmitting the slot reservation bit, which is shown as slot reservation bit 123 in slot 112. In other embodiments, the slot reservation bit may be transmitted on a line that is not dedicated to that purpose. In an embodiment, each packet is transmitted within a slot in ring interconnect 110 with a slot reservation bit. A slot reservation bit may be set if the slot has been reserved for future use by a node, and may be unset if the slot is has not been reserved.

Figure 3:
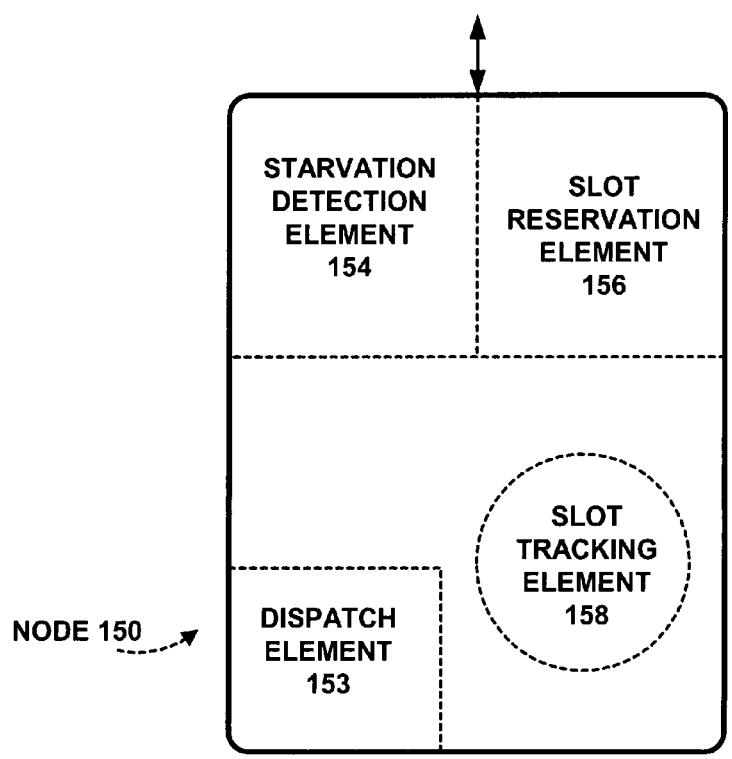
FIG. 3 is a block diagram of a node in accordance with an embodiment of the present invention.

FIG. 3 is a block diagram of a node 150 in accordance with an embodiment of the present invention. As shown in FIGS. 1 and 3, node 150 may have a starvation detection element 154 and a slot reservation element 156. As shown in FIG. 3, node 150 may also have a slot tracking element 158 and a dispatch element 153. Dispatch element 153 may prevent dispatch by that node of a packet into a slot in the ring network if the reservation bit for the slot is set and if the slot was not reserved by that node (i.e., because the slot was reserved by another node). Starvation detection element 154, slot reservation element 156, slot tracking element 158, and dispatch element 153 may be implemented as software instructions, hardware components, or some combination of both.

An attempt by node 150 to dispatch a packet in a slot may be considered to be unsuccessful if the slot is busy transmitting a packet that is destined for another node when that slot arrives at node 150. In an embodiment, starvation detection element 154 may comprise a counter that counts unsuccessful attempts by node 150 to dispatch a packet into a slot in ring interconnect 110. In an embodiment, the starvation counter may be initialized to some value T, which may be the starvation threshold and represent the number of times the node will be allowed to attempt to dispatch onto the ring before declaring that it is starved. In an embodiment, each unsuccessful dispatch attempt results in the starvation counter being decremented, and each successful dispatch onto the ring results in the starvation counter being reset to the value T. If and when the counter reaches 0, the node may be considered to be in a starvation state. The threshold value may be, for example, equal to 128.

In an embodiment, slot reservation element 156 reserves a slot on ring interconnect 110 if starvation detection element 154 determines that a threshold number of unsuccessful attempts to dispatch a packet onto ring interconnect 110 have been made. For example, slot reservation element 156 may comprise logic to set the slot reservation bit for the first slot that arrives that does not have its slot reservation bit set (such as slot 113) and thus reserve that slot for future use by node 150. In an embodiment, slot tracking element 158 may determine if a slot in the ring interconnect is a slot that has been reserved by node 150. For example, slot tracking element 158 may comprise a circular shift register that tracks the location of a slot reserved by node 150 by injecting a marker (i.e., the value "1") into the shift register and shifting one bit position every time each cycle (i.e., each time the slots rotate around the ring). In an embodiment, the shift register equals the number of stops on the ring. In this example, the current slot on the ring interconnect will be the reserved slot if the marker value has shifted around in the shift register to a point that corresponds to the node's position. It is to be understood that tracking, starvation detection, and slot reservation are not limited to the mechanisms described herein. For example, tracking may include any suitable mechanism for tracking a slot in a network.

In an embodiment, the slot reservation bit prevents any node, other than the node that placed the slot reservation bit in the slot, from injecting a new packet into the slot even if the slot is available. Thus, in this embodiment the slot reservation bit placed on a slot s by a node n ensures that, after the packet in slot s has been sunk at its destination d, no other node a between node d and node n will use slot s, even though slot s is available. In this example, when slot s reaches n again, slot s is guaranteed to be available, and thus node n will inject its packet and clear the slot reservation bit.

Figure 4:
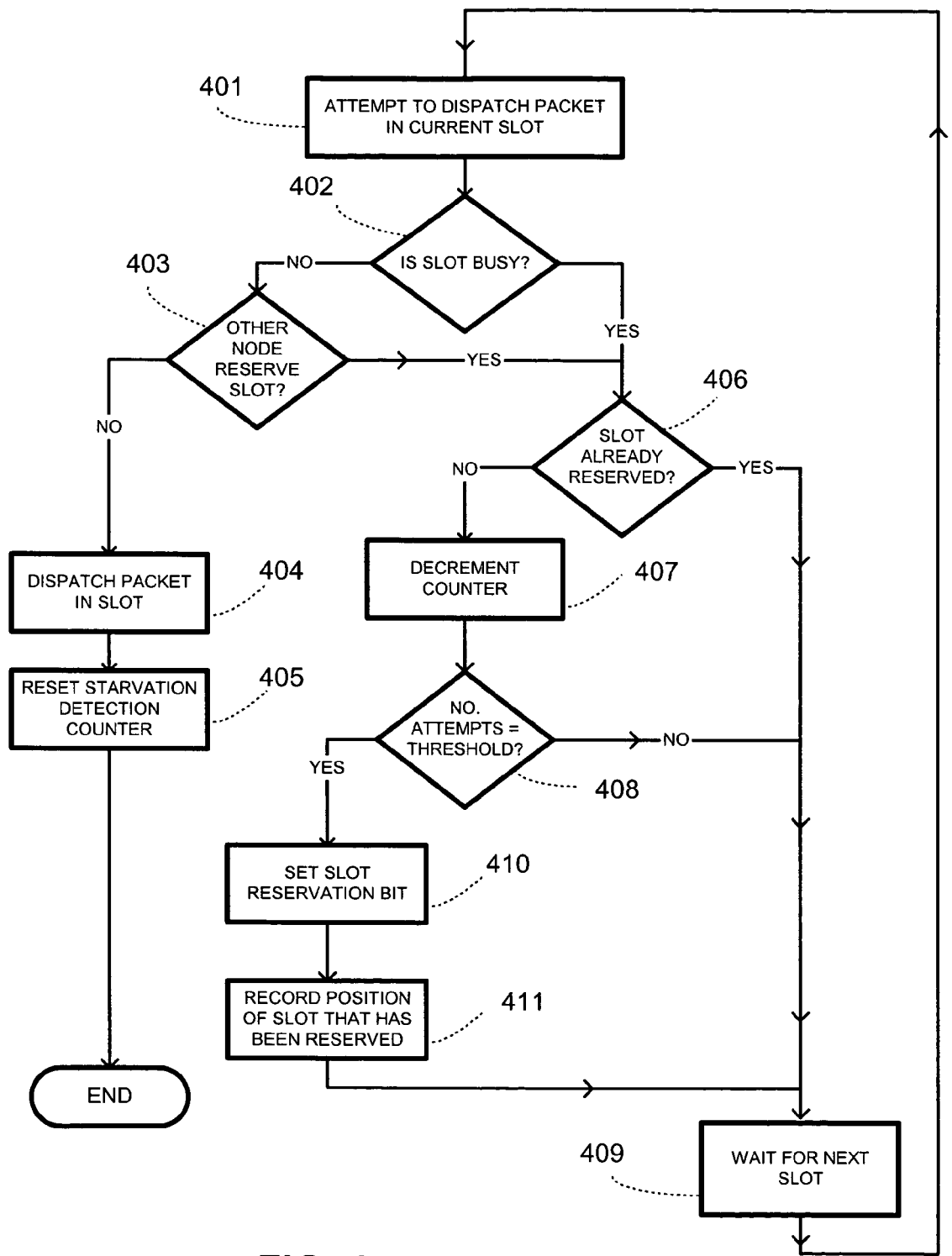
FIG. 4 is a flowchart that illustrates the operation of an embodiment of the present invention.

FIG. 4 is a flowchart that illustrates the operation of an embodiment of the present invention. This method may be practiced in, for example, a network such as described with reference to FIGS. 1-3 above. In the example shown in FIG. 4, a node (such as node 150) may attempt to dispatch a packet onto a ring interconnect in a slotted-ring network. According to this method, the node may attempt to dispatch the packet into a slot (such as on ring interconnect 110) that is currently at the node's position (401). For example, node 150 may attempt to dispatch a packet into slot 113.

If the node determines (402) that the slot is not busy carrying a packet for another node (for example, using conventional methods of making such a determination), then a dispatch element within the node may determine (403) if any other node has reserved that slot for future use. For example, the node may determine that the slot is reserved if a slot reservation bit on ring interconnect 110 is set for that slot and if that bit was not set by that node (i.e., if it was set by another node). The node may track which (if any) of the slots that it has reserved by using a slot tracking element as discussed below. If the slot is not reserved by any of the nodes, then the node may dispatch the packet into the slot (404) and may reset a starvation detection element (405), such as a starvation detection counter, to a threshold value T. Thus, the counter may be reset if an attempt to dispatch the packet is successful. Similarly, if the slot was reserved by the node that is now attempting to dispatch the packet, then the node may dispatch the packet into the reserved slot (404) and may reset a starvation detection element (405).

If the node determines (402) that the slot is busy carrying a packet for another node, then the node may determine if the slot has been reserved (406), for example if another node has set the slot reservation bit. In this embodiment, a node cannot set a reservation bit on a slot if the slot's reservation bit has been set. If the slot has been reserved, then in the embodiment shown the node may wait for the next slot (409) as discussed below. If the slot has not been reserved, then the node may decrement the starvation detection counter (407). If the node determines (408) that even after being decremented the starvation detection counter has not reached zero, then the node may wait for the next slot (such as slot 114) to shift around the ring interconnect to the position of that node (409). After the next slot reaches that position, the node may attempt to dispatch the packet into that slot (401) and will repeat the procedure.

If the node determines (408) that after being decremented the starvation detection counter has reached zero, in which case the node may be considered to be in a starvation condition because a threshold number of attempts to dispatch a packet within a slot in a slotted-ring network were unsuccessful, then a slot reservation element in the node may reserve that slot for future use by the node by setting a slot reservation bit in that slot (410). For example, slot reservation element 156 may set slot reservation bit 123. In addition, a slot tracking element may record the position of the slot that has been reserved so that it can be tracked (411). For example, slot tracking element 158 may record the position of the slot as an entry in a circular shift register. In this example, the node may shift the values in the circular shift register each time a new slot on the ring interconnect rotates past the node. The node may then wait for the next slot to rotate around the ring interconnect to the position of that node (409) and may attempt to dispatch the packet into that slot (401).

In an embodiment, the slot reservation bit for a slot can only be cleared by the node that set that slot reservation bit. In this embodiment, when a slot with its reservation bit set reaches a node that had set the reservation bit, that node may dispatch a packet into the slot (if it has a packet waiting to be dispatched, as discussed above with reference to 403-405) and may clear the reservation bit so that the slot may be used by another node. In an embodiment, a node which has set the slot reservation bit for a slot s does not dispatch into an available slot t and instead waits for the slot that it reserved (slot s) to arrive. When s arrives, the node dispatches (as in the normal case) and clears the reservation bit. In another embodiment, a node will dispatch into the first available slot, but will clear a previously set slot reservation bit when the reserved slot arrives at the node.

In an embodiment, a node may only be able to have a single slot on reservation at any given time. In an alternate embodiment, a node may reserve multiple slots. In this alternative embodiment, a reserved counter may be used to prevent the total number of simultaneous reservations from all nodes from exceeding the number of slots on the ring.

Figure 5:
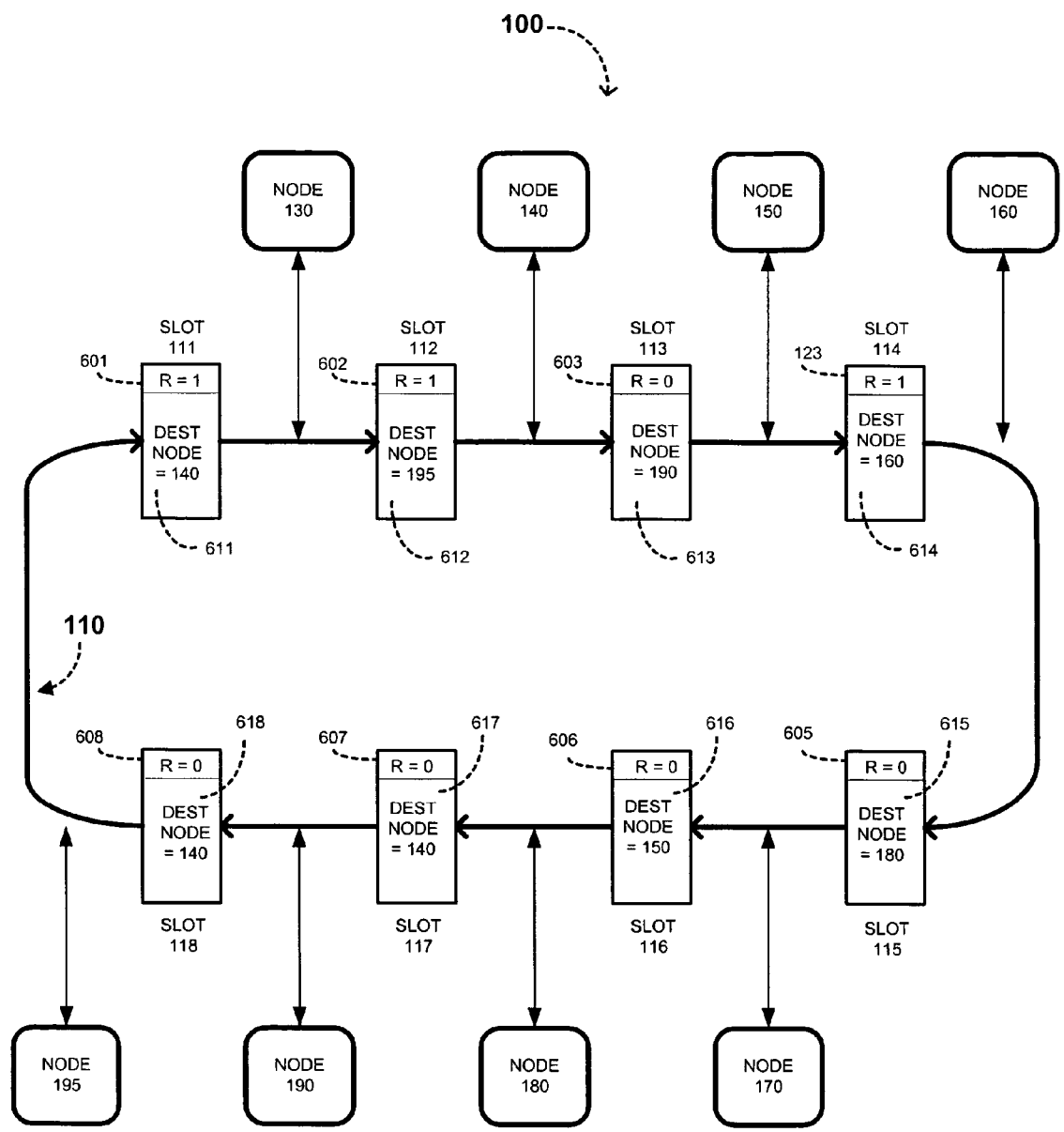
FIG. 5 is a block diagram that illustrates the operation of an embodiment of the present invention.

FIG. 5 is a block diagram that illustrates the operation of an embodiment of the present invention. FIG. 5 contains another embodiment of the slotted-ring network 100 of FIG. 1. In FIG. 5, network 100 includes an interconnect 110 and nodes 130, 140, 150 ad 160 as shown in FIG. 1. In addition, in FIG. 5 network 100 also contains additional nodes 170, 180, 190 and 195. In FIG. 5, interconnect 110 has eight slots (111, 112, 113, 114, 115, 116, 117, and 118). In other embodiments, network 100 may contain more or less nodes and/or slots.

In some embodiments, the network 100 may be a multi-core processor, and each of the nodes may be sub-components of the processor. In one embodiment, each of the nodes may be a processor core capable of program execution. In one embodiment, all cores may be homogenous (i.e., have approximately the same processing functions and throughput), whereas in other embodiments, the cores may be heterogeneous and have substantially different functions and/or throughput.

In FIG. 5, all the slots are currently carrying packets as follows: slot 111 is carrying a packet 611 that is destined for node 140; slot 112 is carrying a packet 612 that is destined for node 195; slot 113 is carrying a packet 613 that is destined for node 190; slot 114 is carrying a packet 611 that is destined for node 160; slot 115 is carrying a packet 615 that is destined for node 180; slot 116 is carrying a packet 616 that is destined for node 150; slot 117 is carrying a packet 617 that is destined for node 140; and slot 118 is carrying a packet 618 that is destined for node 140. Each of the slots (111-118) also has a slot reservation bit (601-608, respectively). Of these, slots 111, 112 and 114 have their slot reservation bits set.

Assume that node 130 has reached its starvation threshold because T slots had reached node 130, but each of these T slots was carrying a packet for another node. Assume also that node 130 had set the slot reservation bit on slot 114 (which is currently carrying a packet to node 160). After node 160 sinks the packet from slot 114, none of nodes 170, 180, 190 and 195 will be able to use the slot (because the slot reservation bit is set) and node 130 will be able to place its starving packet into the empty slot 114.

Figure 6:
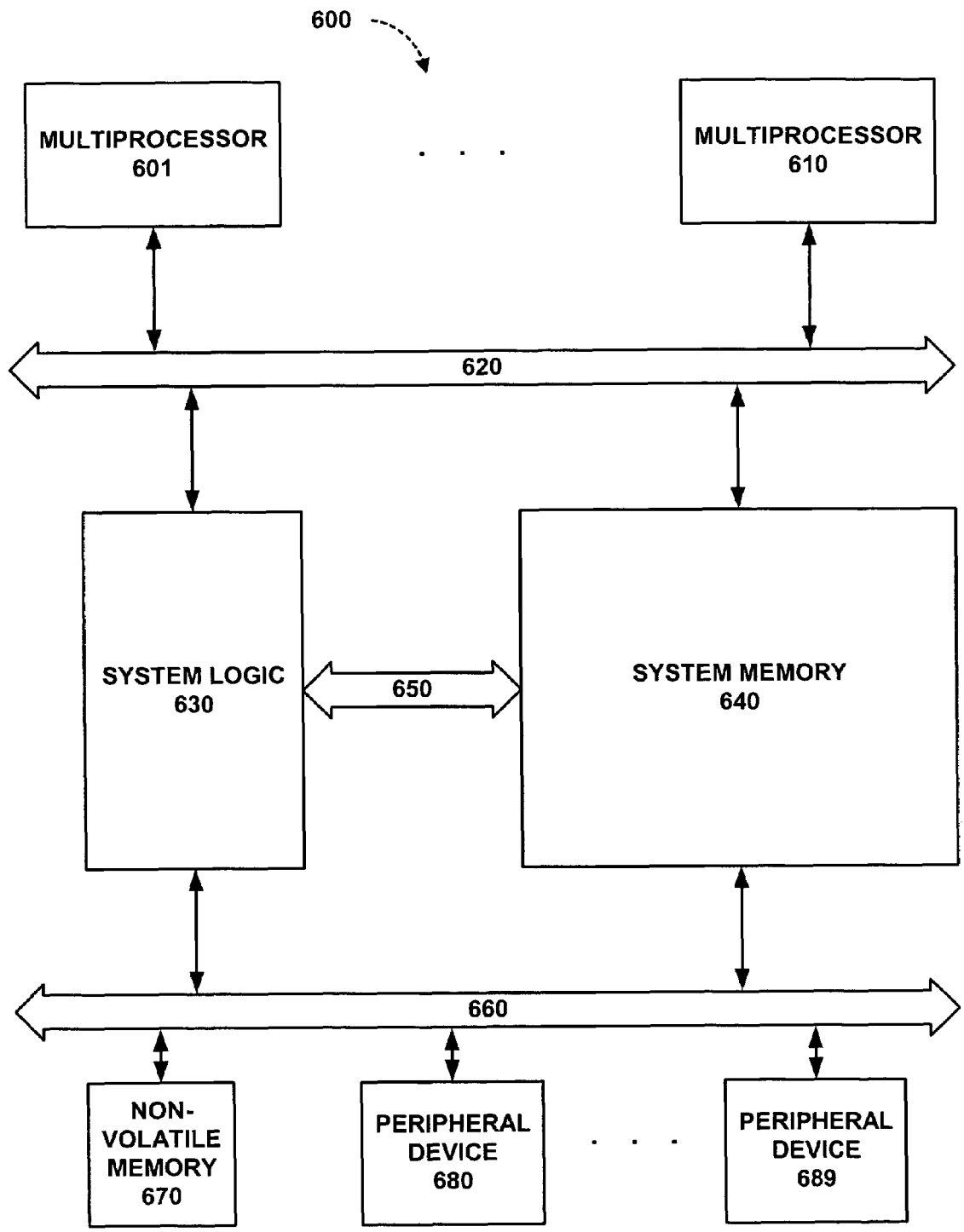
FIG. 6 is a block diagram of a system that implements an embodiment of the present invention.

FIG. 6 is a block diagram of a system that implements an embodiment of the present invention. In FIG. 6, computer system 600 may include one or more multiprocessors 601-610 coupled to a processor bus 620, which may be coupled to a system logic 630. Each of the one or more multiprocessors 601-610 may be N-bit processors and may include a decoder and one or more N-bit registers. In accordance with an embodiment of the present invention, each of the one or more multiprocessors 601-610 may include a bidirectional and/or unidirectional ring interconnect (not shown) to couple to the N-bit processors, the decoder, and the one or more N-bit registers. The interconnect and nodes may be adapted to prevent starvation as discussed above.

System logic 630 may be coupled to a system memory 640 through a bus 650 and coupled to a non-volatile memory 670 and one or more peripheral devices 680-689 through a peripheral bus 660. Peripheral bus 660 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 670 may be a static memory device such as a read only memory (ROM) or a flash memory. Peripheral devices 680-689 may include, for example, a keyboard; a mouse or other pointing devices; mass storage devices such as hard disk drives, compact disc (CD) drives, optical disks, and digital video disc (DVD) drives; displays and the like. In some embodiments, point-to-point links may be employed to couple these various components. For example, each processor may have multiple ports, and each port may connect to one single other port on another component or bus agent.

Embodiments of the present invention may be implemented using any type of computer, such as a general-purpose microprocessor, programmed according to the teachings of the embodiments. The embodiments of the present invention thus also include a machine readable medium, which may include instructions used to program a processor to perform a method according to the embodiments of the present invention. This medium may include, but is not limited to, any type of disk including floppy disk, optical disk, and CD-ROMs.

It may be understood that the method of an embodiment of the present invention may be implemented by software, hardware, or a combination thereof. It may be further understood that the structure of the software used to implement the embodiments of the invention may take any desired form, such as a single or multiple programs.

It is to be understood that the examples discussed are for illustration purposes only and are not intended to limit the configuration to that shown. For example, the ring interconnect 110 may include one or more ring structures capable of transporting packets in unidirectional or bidirectional directions. Additionally, more than one ring slot may be positioned between two nodes at any time. Conversely, more than one node may be positioned between two ring slots at any time. The packet transport rate need not be limited to one node per clock cycle, but may comprise multiple nodes per clock cycle or one node per multiple clock cycles, depending on the application.

The above is a detailed discussion of the certain embodiments. It is of course intended that the scope of the claims may cover other embodiments than those described above and their equivalents.

What is claimed is:

1. A network comprising:
a ring interconnect to transmit a plurality of bits, wherein one of the bits is a slot reservation bit; and
a plurality of nodes coupled to the ring interconnect, wherein each node comprises:
a starvation detection element to detect a number of unsuccessful attempts to dispatch a packet into a slot in the ring interconnect, wherein the starvation detection element comprises a starvation counter set to a first value wherein each unsuccessful dispatch results in the starvation counter being changed, each successful dispatch results in a reset to the first value, and the starvation counter reaching a final value indicates a starvation state;
a slot reservation element to reserve a first slot on the ring interconnect for future use by the node if said starvation detection element detects that the number of unsuccessful attempts to dispatch the packet into the first slot in the ring interconnect exceeds a threshold; and
a slot tracking element, wherein the slot tracking element comprises a circular shift register to track a location of slots reserved by said each node.

2. The network of claim 1, wherein the ring interconnect comprises a plurality of lines, and wherein one of the lines is dedicated to transmitting the slot reservation bit.

3. The network of claim 1, wherein the ring interconnect transmits the plurality of bits within a plurality of slots, and wherein the slot reservation element comprises logic to set the slot reservation bit for the plurality of slots.

4. A node comprising:
a starvation counter to count unsuccessful attempts to dispatch a packet into a slot in a ring interconnect in a slotted-ring network, wherein each unsuccessful dispatch results in the starvation counter being changed, each successful dispatch results in a reset to the first value, and the starvation counter reaching a final value indicates a starvation state;
a slot reservation element to reserve the slot in the ring interconnect for future use by the node if a number of unsuccessful attempts to dispatch a packet into the slot in the ring interconnect exceeds a threshold; and
a slot tracking element to determine if a slot in the ring interconnect is the reserved slot, wherein the slot tracking element comprises a circular shift register to track a location the slot reserved by said each node.

5. The node of claim 4, wherein the slot reservation element is to reserve the slot if a threshold number of unsuccessful attempts to dispatch the packet onto the network have been made.

6. The node of claim 4, wherein the node further comprises a dispatch element to prevent dispatch by that node of the packet into the slot in the slotted-ring network if the slot was reserved by another node.

7. A system comprising:
a ring interconnect to transmit a plurality of packets, wherein each packet is transmitted within a slot with a slot reservation bit; and
a plurality of nodes coupled to the ring interconnect, wherein at least one of the nodes comprises:
a starvation detection element to detect a number of unsuccessful attempts to dispatch a packet into the slot on the ring interconnect, wherein the starvation detection element comprises a starvation counter set to a first value wherein each unsuccessful dispatch results in the starvation counter being changed, each successful dispatch results in a reset to the first value, and the starvation counter reaching a final value indicates a starvation state;
a slot reservation element to reserve a first slot for future use by the node if said starvation detection element detects that the number of unsuccessful attempts to dispatch a packet into the first slot on the ring interconnect exceeds a threshold; and
a slot tracking element, wherein the slot tracking element comprises a circular shift register to track a location of the slot reserved by said each node.

8. The system of claim 7, wherein the system is implemented on a single semiconductor chip.

9. The system of claim 8, wherein at least one of the nodes further comprises a processor.

10. A method comprising:
determining at a node that a threshold number of attempts to dispatch a packet within slots in a slotted-ring network were unsuccessful because the slots were busy;
reserving a slot in the slotted-ring network for future use by the node; and
dispatching the packet from the node into the reserved slot,
wherein a starvation detection element comprises a starvation counter set to a first value wherein each unsuccessful dispatch results in the starvation counter being changed, each successful dispatch results in a reset to the first value, and the starvation counter reaching a final value indicates a starvation state, and
wherein a slot tracking element comprises a circular shift register to track a location of the slot reserved by said each node.

11. The method of claim 10, wherein reserving the slot in the slotted-ring network comprises setting a slot reservation bit within the slot.

12. The method of claim 11, wherein reserving the slot in the slotted-ring network further comprises tracking the location of the reserved slot.

13. A single monolithic integrated circuit processing device comprising:

a ring interconnect structure;

a plurality of processing nodes, each of said plurality of processing nodes being coupled to the ring interconnect structure, each of said plurality of processing nodes having a ring interface portion to provide said processing node access to said ring interconnect structure, each processing node including a starvation detection element to detect a number of unsuccessful attempts to dispatch the packet into a slot on the ring interconnect structure wherein the starvation detection element comprises a starvation counter set to a first value wherein each unsuccessful dispatch results in the starvation counter being changed, each successful dispatch results in a reset to the first value, and the starvation counter reaching a final value indicates a starvation state, a slot reservation element to reserve a first slot for future use by the node if said starvation detection element detects that the number of unsuccessful attempts to dispatch the packet into the first slot on the ring interconnect structure exceeds a threshold; and a slot tracking element, wherein the slot tracking element comprises a circular shift register to track a location of the slot reserved by said each node.

14. The processing device of claim 13, wherein said plurality of processing nodes are a plurality of homogenous processor cores.

15. The processing device of claim 13, wherein said plurality of processing nodes are a plurality of heterogeneous processor cores.

16. The processing device of claim 13, wherein said plurality of processing nodes comprise a cache and a plurality of processor cores.

17. The processing device of claim 16, wherein said plurality of processing nodes further comprise a graphics processing node.

* * * * *